United States Patent
Choi et al.

(10) Patent No.: US 12,019,918 B2
(45) Date of Patent: **\*Jun. 25, 2024**

(54) STORAGE DEVICE WITH REDUCED COMMUNICATION OVERHEAD USING HARDWARE LOGIC

(71) Applicant: Samsung Electronics Co., Ltd., Suwon-si (KR)

(72) Inventors: Wan-Soo Choi, Hwaseong-si (KR); Young Wook Kim, Hwaseong-si (KR); Dong Eun Shin, Seoul (KR); Yong Chan Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/883,261

(22) Filed: Aug. 8, 2022

(65) Prior Publication Data

US 2022/0374174 A1 Nov. 24, 2022

Related U.S. Application Data

(63) Continuation of application No. 16/745,451, filed on Jan. 17, 2020, now Pat. No. 11,435,947.

(30) Foreign Application Priority Data

Jul. 2, 2019 (KR) .......................... 10-2019-0079067

(51) Int. Cl.
*G06F 3/06* (2006.01)
*G06F 9/48* (2006.01)
*G06F 9/54* (2006.01)

(52) U.S. Cl.
CPC .......... *G06F 3/0659* (2013.01); *G06F 3/0604* (2013.01); *G06F 3/0613* (2013.01);
(Continued)

(58) Field of Classification Search
CPC .... G06F 3/0659; G06F 3/0604; G06F 3/0613; G06F 3/0631; G06F 3/0661; G06F 3/0673; G06F 9/485; G06F 9/546
See application file for complete search history.

(56) References Cited

U.S. PATENT DOCUMENTS 7,877,535 B2   1/2011  Yoo et al.
8,521,964 B2   8/2013  Woffinden
(Continued)

FOREIGN PATENT DOCUMENTS

JP   2014-063481 B   1/2015
KR   100936601 B1   1/2010
(Continued)

OTHER PUBLICATIONS

First Office Action dated Sep. 10, 2021 from the Indian Patent Office for Corresponding Indian Patent No. IN 202034023036.
(Continued)

*Primary Examiner* — Ernest Unelus
(74) *Attorney, Agent, or Firm* — Muir Patent Law, PLLC

(57) ABSTRACT

A storage device includes an input stage receiving a first command, a queue manager allocating a first queue entry for the first command, a pre-processor storing the first command in the first queue entry and updating a task list with the first command and a core executing the first command in accordance with an order specified in the updated task list. At least one of the queue manager and the pre-processor is implemented in a customized logic circuit.

20 Claims, 15 Drawing Sheets

(52) U.S. Cl.
CPC .......... *G06F 3/0631* (2013.01); *G06F 3/0661* (2013.01); *G06F 3/0673* (2013.01); *G06F 9/485* (2013.01); *G06F 9/546* (2013.01)

(56) References Cited

U.S. PATENT DOCUMENTS

| | | |
|---|---|---|
| 8,726,048 B2 | 5/2014 | Naveh et al. |
| 9,053,008 B1 | 6/2015 | Horn et al. |
| 9,170,841 B2 | 10/2015 | Fukuzaki et al. |
| 9,582,287 B2 | 2/2017 | Shifer et al. |
| 9,747,108 B2 | 8/2017 | Ben-Kiki et al. |
| 10,268,630 B1 | 4/2019 | Dropps |
| 2006/0067314 A1 | 3/2006 | Ho et al. |
| 2006/0174246 A1 | 8/2006 | Tamura et al. |
| 2010/0077175 A1 | 3/2010 | Wu et al. |
| 2012/0096292 A1 | 4/2012 | Mekhiel |
| 2013/0060981 A1 | 3/2013 | Horn et al. |
| 2015/0309742 A1 | 10/2015 | Amidi et al. |
| 2017/0115880 A1 | 4/2017 | Chang et al. |
| 2017/0269960 A1 | 9/2017 | Diestelhorst et al. |
| 2020/0159568 A1* | 5/2020 | Goyal .................. G06F 9/4843 |

FOREIGN PATENT DOCUMENTS

| | | |
|---|---|---|
| KR | 10-2011-0112810 A | 10/2011 |
| KR | 10-2017-0002256 A | 1/2017 |

OTHER PUBLICATIONS

First Office Action issued Jan. 3, 2024 by the Korean Intellectual Property Office for corresponding patent application KR 10-2019-0079067.

* cited by examiner

FIG. 4

| CMD INDEX | QUEUE ENTRY GROUP |
|---|---|
| 1 | QGA |
| . . . | . . . |
| 5 | QGA |
| 6 | QGB |
| . . . | . . . |
| 10 | QGB |
| 11 | QGC |
| . . . | . . . |
| 15 | QGC |

FIG. 6

| QUEUE ENTRY | a1 | a2 | ... | an |
|---|---|---|---|---|
| FREE | 1 | 0 | | 0 |

133a

| QUEUE ENTRY | b1 | b2 | ... | bn |
|---|---|---|---|---|
| FREE | 1 | 1 | | 0 |

133b

| QUEUE ENTRY | c1 | c2 | ... | cn |
|---|---|---|---|---|
| FREE | 0 | 0 | | 0 |

133c

STORAGE DEVICE WITH REDUCED COMMUNICATION OVERHEAD USING HARDWARE LOGIC

This application is a continuation of U.S. application Ser. No. 16/745,451 filed on Jan. 17, 2020 which claims priority from Korean Patent Application No. 10-2019-0079067 filed on Jul. 2, 2019 in the Korean Intellectual Property Office, the disclosure of which is incorporated herein by reference in its entirety.

BACKGROUND

1. Field of the Invention

The present invention relates to a storage device.

2. Description of the Related Art

Flash memories as a nonvolatile memory maintain stored data even when a power is cut off. Recently, an embedded Multi-Media Card (eMMC), a Universal Flash Storage (UFS), a Solid State Drive (SSD), and a memory card as storage devices have become widely used, and the storage devices are used for storing or moving large amounts of data.

SUMMARY

In order to improve the performance of a storage device, a processing amount per unit time of a processor may be improved by increasing an operating frequency. Although this method is simple, since there is a limitation on increasing the frequency, there is a limitation on improving the performance of the entire storage device. Alternatively, it is possible to improve performance, using a plurality of processors. However, due to a communication overhead between the processors in this method, the performance is not improved as much as expected from the increase in the number of processors. Aspects of the present invention provide a storage device with a reduced communication overhead when using a plurality of processors.

However, aspects of the present invention are not restricted to the one set forth herein. The above and other aspects of the present invention will become more apparent to one of ordinary skill in the art to which the present invention pertains by referencing the detailed description of the present invention given below.

According to an exemplary embodiment of the present inventive concept, a storage device includes an input stage receiving a first command, a queue manager allocating a first queue entry for the first command, a pre-processor storing the first command in the first queue entry and updating a task list with the first command and a core executing the first command in accordance with an order specified in the updated task list. At least one of the queue manager and the pre-processor is implemented in a customized logic circuit.

According to an exemplary embodiment of the present inventive concept, a storage device includes a command receiving a first command, interpreting the first command and generating an interpreted result of the first command, a queue entry requester generating, in response to a signal indicating that a first queue entry for the first command is allocated by a queue manager, a change instruction signal and an update instruction signal, a data formatter receiving the change instruction signal and changing a format of the first command stored in the first queue entry, a list manager receiving the update instruction signal and updating a first task list with the first command, and a handler outputting, in response to a signal indicating that the data formatter completes change of a format of the first command and a signal indicating that the list manager completes the update of the first task list, the completion of the change and the completion of the update to a core so that the first command is executed by the core in accordance with an order specified in the updated first task list.

According to an exemplary embodiment of the present inventive concept, a storage device includes a first unit processor which receives a first command and outputs a second command, and a second unit processor which receives the second command. The first unit processor includes a first input stage which receives the first command, a first queue manager which allocates a first queue entry for the first command, a first pre-processor which stores the first command in the first queue entry and updates a first task list so that the first command is reflected, a first core which executes the first command in accordance with an order specified in the updated first task list, and outputs a first result value according to execution of the first command, and a first post-processor which generates and outputs a second command in accordance with a preset format on the basis of first result value. At least one of the first queue manager, the first pre-processor, and the first post-processor is implemented in a customized logic circuit.

According to an exemplary embodiment of the present inventive concept, a storage device includes a nonvolatile memory which stores data, and a controller which controls an operation of the nonvolatile memory. The controller includes a plurality of unit processors arranged to cooperatively perform the operation of the nonvolatile memory, and each unit processor includes a customized logic circuit which receives a first command, updates a task list with the first command, changes the first command to have a preset format and stores the first command, and a core which executes the first command in accordance with an order specified in the updated task list.

BRIEF DESCRIPTION OF THE DRAWINGS

The above and other aspects and features of the present invention will become more apparent by describing in detail exemplary embodiments thereof with reference to the attached drawings, in which:

FIG. 4 is a diagram for explaining a queue entry group corresponding to a type of command;

FIG. 6 is a diagram for explaining a queue entry group manager of FIG. 3;

DETAILED DESCRIPTION OF THE EMBODIMENTS

Hereinafter, various embodiments of the present invention will be described with reference to the accompanying drawings.

Figure 1:
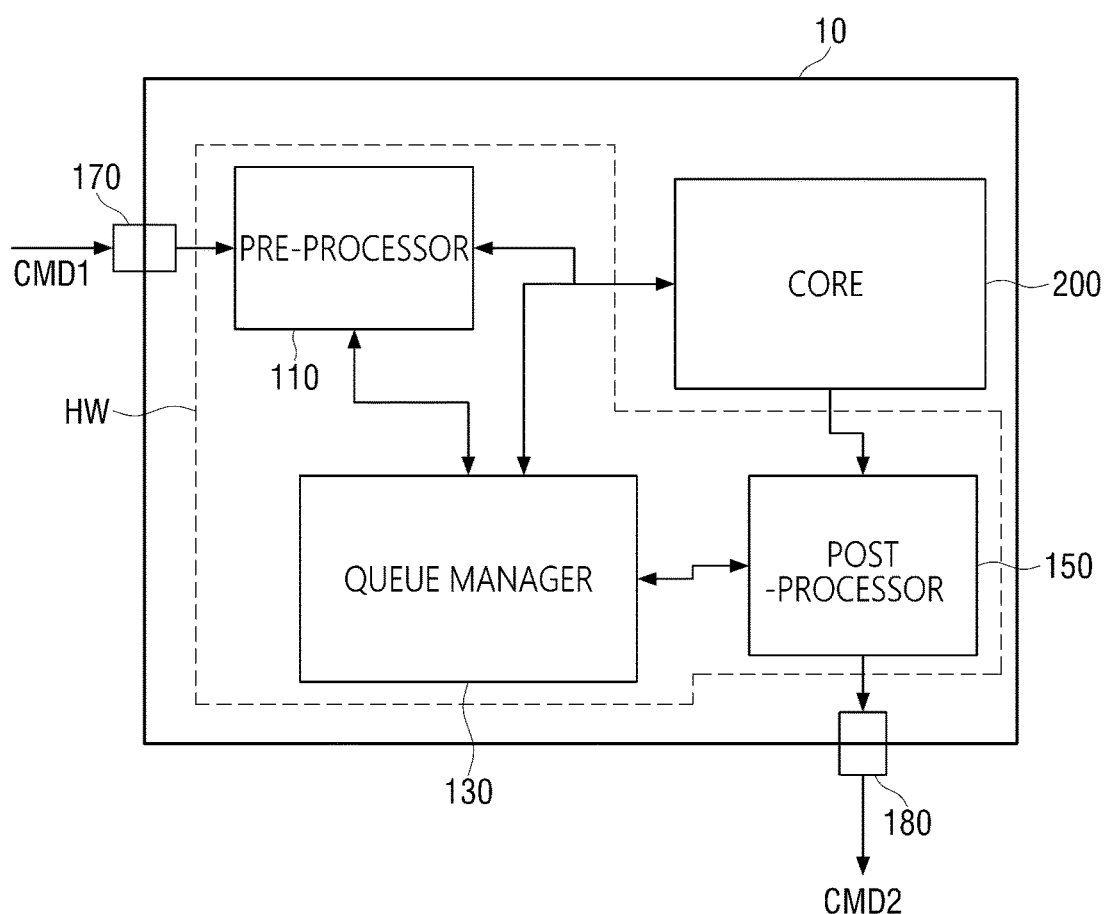
FIG. 1 is a block diagram for explaining a storage device according to a first embodiment of the present invention.

FIG. 1 is a block diagram for explaining a configuration of a unit processor used in a controller of a storage device.

Referring to FIG. 1, in the storage device according to the first embodiment of the present invention, the unit processor 10 includes a pre-processor 110, a queue manager 130, a post-processor 150, a core 200, an input stage 170, an output stage 180, and the like.

A first command CMD1 is provided to the input stage 170. Although only one input stage is shown in FIG. 1 as an example, the present invention is not limited thereto. For example, two or more input stages may be included. The input stage 170 may include a terminal such as pads, leads or balls. The input stage 170 may further include input buffers or input registers.

The pre-processor 110 parses/interprets the first command CMD1. According to an interpreted result, the pre-processor 110 requires the queue manager 130 to allocate a queue entry for the first command CMD1. After receiving the allocation request of the queue entry from the pre-processor 110, the queue manager 130 allocates a queue entry (i.e., a first queue entry) for the first command CMD1. The pre-processor 110 stores the first command CMD1 in the allocated first queue entry, and updates a task list so that the first command CMD1 is reflected (i.e., updates a task list with the first command CMD1). Here, the pre-processor 110 may assist the rapid execution of the core 200 by changing the format of the first command CMD1 and storing the first command CMD1 of the changed format in the first queue entry.

The core 200 executes the first command CMD1 in accordance with the order of the updated task list. The core 200 outputs a result value obtained by executing the first command CMD.

The post-processor 150 generates and outputs a second command CMD2 in accordance with a preset format on the basis of the result value.

The core 200 executes an appropriate operation depending on the content of the first command CMD1, and thus is driven by software or firmware. For example, logic elements of the core 200 may be micro-programmed with the software or firmware to operate in response to the first command CMD1.

In the storage device according to the first embodiment of the present invention, at least one of the pre-processor 110, the queue manager 130 and the post-processor 150 is implemented by hardware logic HW (e.g., a customized logic circuit). That is, processes such as an interpretation of the first command CMD1, an allocation of the first queue entry for storing the first command CMD1, a storage of the first command CMD1 in the first queue entry, a format change of the first command CMD1, an update of the task list for reflecting the first command CMD1, and a generation of the second command CMD2 are performed in accordance with a preset process by the hardware logic HW. For example, the pre-processor 110 may be customized as a pre-processor circuit to implement the function of the pre-processor 110, the queue manager 130 may be customized as a queue manager circuit to perform the function of the queue manager 130, and the post-processor 150 may be customized as a post-processor circuit to perform the function of the post-processor 150.

The core 200 may execute the first command CMD1 in accordance with the order of the updated task list. That is, the core 200 does not need to perform various pre-processes necessary for performing the first command CMD1 (such as the interpretation of the first command CMD1, the allocation of the first queue entry for storing the first command CMD1, the storage of the first command CMD1 in the first queue entry, the format change of the first command CMD1, and the update of the task list for reflecting the first command CMD1), or various post-processes necessary after performing the first command CMD1 (such as the generation of the second command CMD2).

The core 200 and the remaining hardware logic HW (i.e., the pre-processor 110, the queue manager 130 and the post-processor 150) operate in parallel. In other words, while the core 200 is executing the first command CMD1, the queue manager 130 may allocate another queue entry (e.g., a third queue entry) for other commands (e.g., a third command) other than the first command CMD1. Or, while the core 200 is executing the first command CMD1, the pre-processor 110 may store the third command in the other allocated third queue entry or may update the task list so that the stored third command is reflected.

In this way, since the core 200 and the remaining hardware logic HW operate in parallel, the core 200 may concentrate only on executing the commands, and the command execution speed of the storage device may increase.

When a controller includes the plurality of processors arranged to cooperatively control the operation of the storage device (or at least one nonvolatile memory therein), each processor exchanges many commands with the associated processor. Such cooperative arrangement of the plurality of processors will be described with reference to FIGS. 13 and 14, for example. As the number of processors used increases, the number of commands exchanged between the processors increases. If the processor performs pre-processing before executing the command and post-processing after executing the command in accordance with the software, the processor may not perform a substantial command execution (e.g., a substantial operation) (other than pre-processing/post-processing), while performing pre-processing/post-processing. The pre-processing/post-processing act as a communication overhead in operations between the plurality of processors.

In the first embodiment of the present invention, such pre-processing/post-processing are implemented in hardware logic HW (i.e., the pre-processor 110, the queue manager 130, the post-processor 150, and the like), thereby minimizing the communication overhead. Also, by allowing the core 200 to concentrate on the substantial command execution operation, overall operations of the processor may be made efficient.

Figure 2:
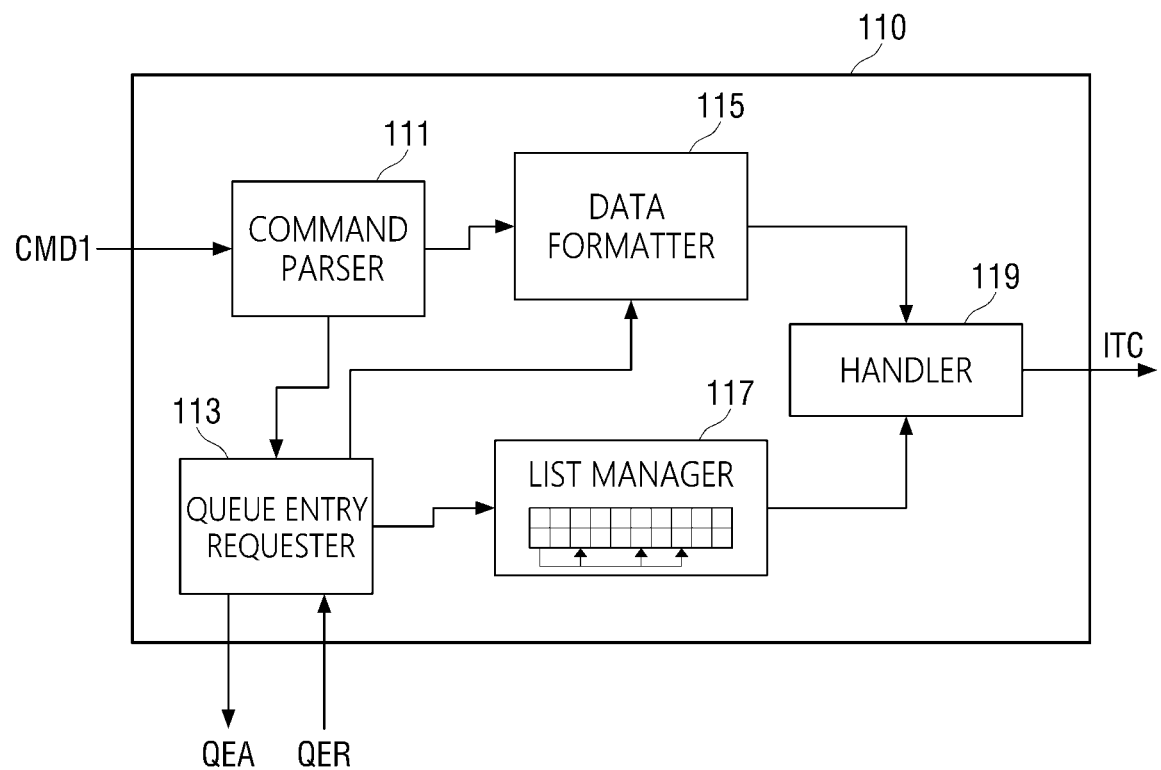
FIG. 2 is an exemplary block diagram for explaining a pre-processor of FIG. 1.
Figure 3:
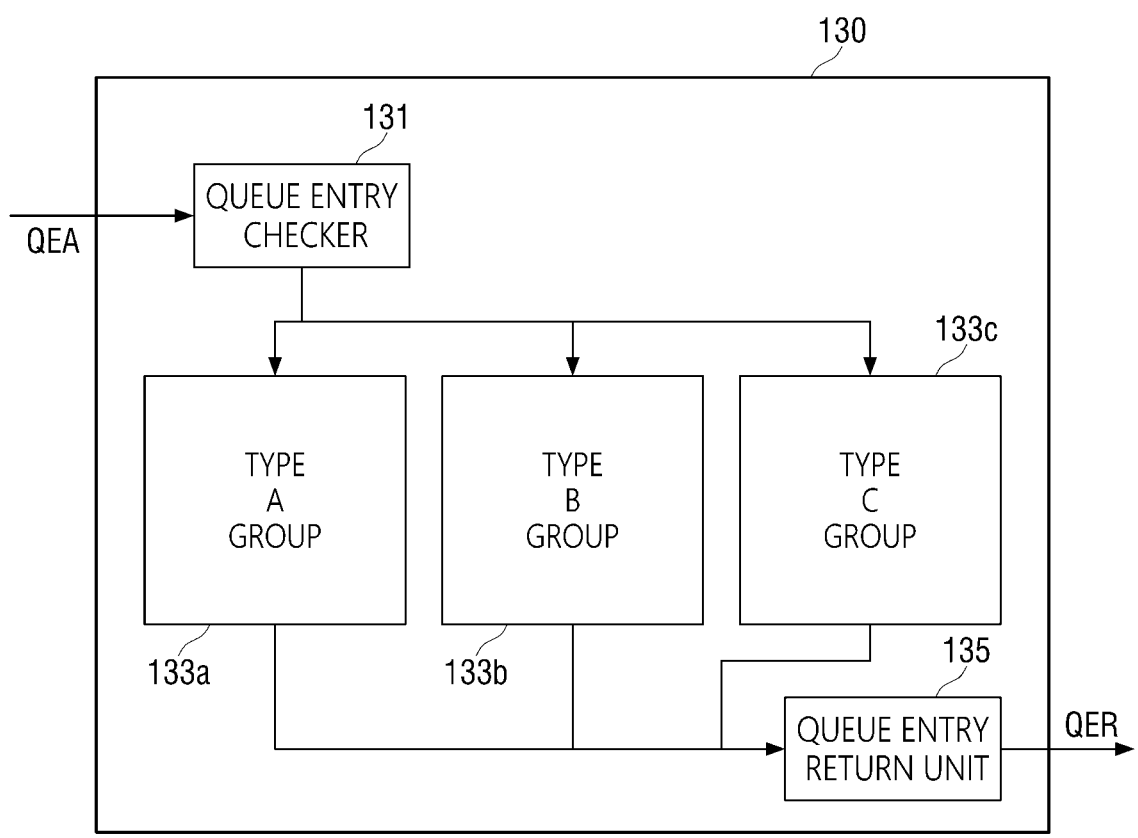
FIG. 3 is an exemplary block diagram for explaining a queue manager of FIG. 1.
Figure 5:
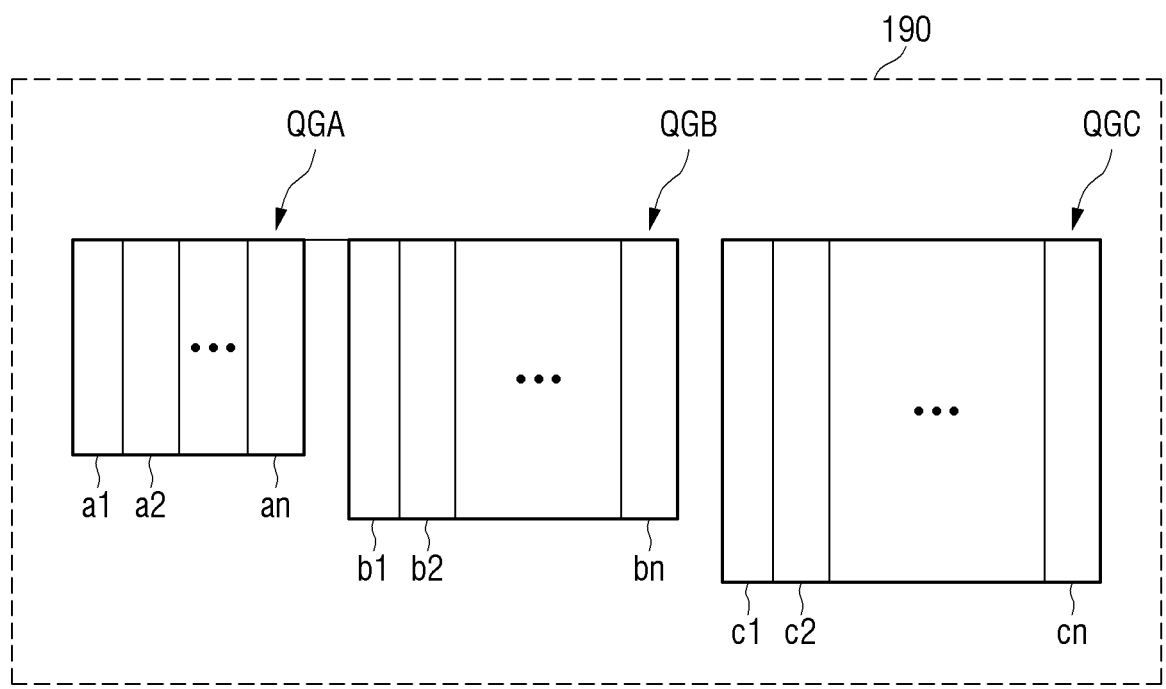
FIG. 5 is a diagram for explaining the queue entry group defined in the memory.
Figure 7:
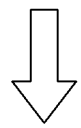
FIG. 7 is a diagram for explaining the operation of the queue entry group manager of FIG. 3.
Figure 8:
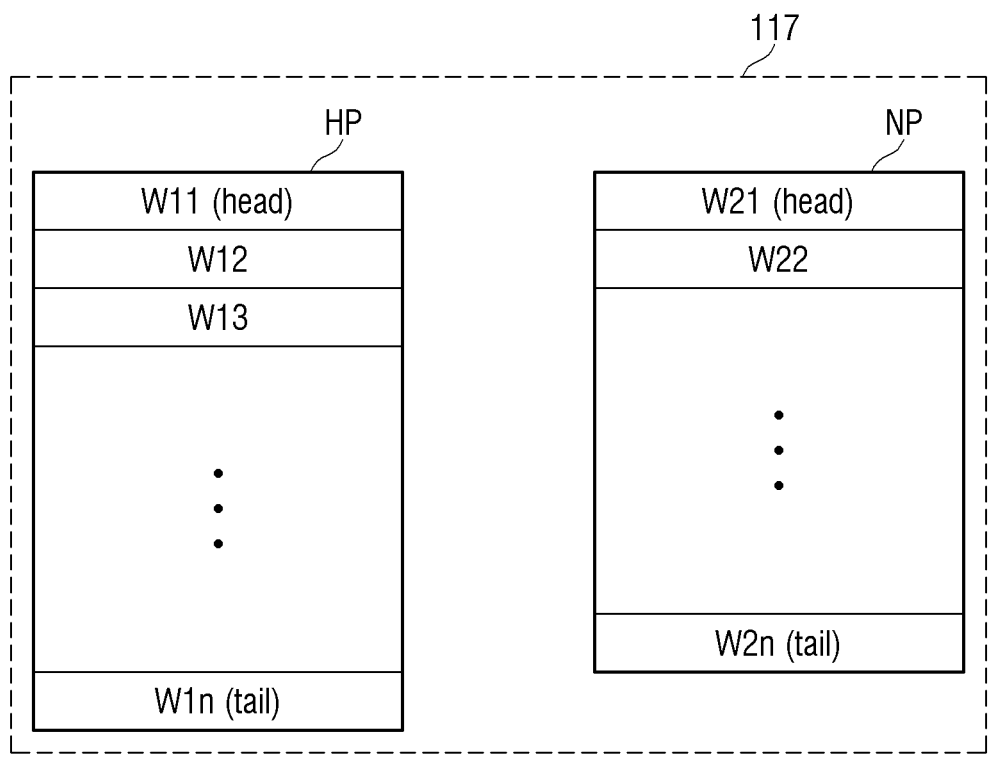
FIG. 8 is a diagram for explaining a task list managed by the list manager of FIG. 2.

FIG. 2 is an exemplary block diagram for explaining the pre-processor of FIG. 1. FIG. 3 is an exemplary block diagram for explaining the queue manager of FIG. 1. FIG. 4 is a diagram for explaining a queue entry group corresponding to a type of a command. FIG. 5 is a diagram for explaining a queue entry group defined in a memory. FIG. 6 is a diagram for explaining the queue entry group manager of FIG. 3. FIG. 7 is a diagram for explaining the operation of the queue entry group manager of FIG. 3. FIG. 8 is a diagram for explaining a task list managed by a list manager of FIG. 2.

First, referring to FIG. 2, the pre-processor 110 includes a command parser 111, a queue entry requester 113, a data formatter 115, a list manager 117 and a handler 119.

The command parser 111 fetches and interprets the first command CMD1 provided from the input stage 170.

For example, the first command CMD1 is made up of a plurality of bits, and may include, for example, fields such as a start bit, a transmission bit, a command index, a command variable, an error detection bit, an end bit, and a queue entry bit. The command parser 111 may parse the first command CMD1 for each field to interpret the meaning of each field.

The start bit is a bit for reporting the start of the command, and may be fixed to, for example, 0. The transmission bit is a bit indicating a subject which generates the command, and may indicate, for example, a command generated by the host, for example, in the case of 1.

The command index indicates the type of a command, and indicates a specific command among many commands that may be executed by the storage device. For example, when the command index is 1, it may be a write command, and if the command index is 2, it may be a read command. The storage device may recognize what command is input depending on the command index, and executes the recognized command.

The command variable may include information necessary for performing an operation corresponding to the command. For example, when the command is the write command or the read command, the command variable may include start address information of the memory cell array of the nonvolatile memory to be written or read, and data size information of the write data or the read data. Further, when the command is a write command, the command variable may also include information on reliable write or forced write.

An error detection bit (e.g., Cyclic Redundancy Check (CRC)) is used to detect an error that may occur when the command is transmitted, and may be implemented by, for example 7 bits. The end bit is a bit for reporting the end of the command, and may be fixed to, for example, 1.

The queue entry bit is a bit indicating a queue entry to be used by the first command CMD1. If the queue entry to be used is not allocated in advance, it may be fixed to a specific value (e.g., 0). When the queue entry to be used is allocated in advance, the index of the queue entry may be indicated.

The queue entry requester 113 requests the queue manager 130 for a queue entry for the first command CMD1, depending on the result interpreted by the command parser 111.

As described above, the type of command may be known through the command index. Depending on the type of command, a distinction may be made between a case in which the queue entry has already been allocated and as case in which the queue entry needs to be newly allocated.

In the case in which the queue entry has already been allocated, the queue entry requester 113 does not transmit a queue entry request QEA to the queue manager 130. The queue entry may have the queue entry bit as described above. For example, when the value of the queue entry bit is 0, the queue entry requester, in response to the interpretation of the command parser 111, does not transmit the queue entry request QEA to the queue manager 130.

When a queue entry needs to be newly allocated, the queue entry requester 113 transmits a queue entry request QEA for the first command CMD1 to the queue manager 130.

Here, referring to FIG. 3, the queue manager 130 includes a queue entry checker 131, queue entry group managers 133a, 133b and 133c, and a queue entry return unit 135.

When receiving the queue entry request QEA from the queue entry requester 113, the queue entry checker 131 determines the type of command, using the command index. The queue entry to be allocated may differ depending on the type of command. That is, a group corresponding to the type of command is determined, and a queue entry of a free state is allocated in the corresponding group.

For example, referring to FIG. 4, when the command index of the command is within 1 to 5, a queue entry belonging to the queue entry group A(QGA) is allocated, when the command index is within 6 to 10, a queue entry belonging to the entry group B(QGB) is allocated, and when the command index is within 11 to 15, a queue entry belonging to the queue entry group C(QGC) may be allocated.

Here, a preset memory 190 includes a plurality of queue entries. The preset memory 190 may be disposed inside the unit processor 10 or outside the unit processor 10. The memory may be volatile memory such as a random access memory (RAM), a static RAM (SRAM), and a dynamic RAM (DRAM), but is not limited thereto.

As shown in FIG. 5, a plurality of queue entries (a1 to an, b1 to bn, and c1 to cn) may be divided into a plurality of queue entry groups QGA, QGB and QGC. A first queue entry group QGA includes a plurality of first queue entries (a1 to an, where n is a natural number), a second queue entry group QGB includes a plurality of second queue entries (b1 to bn), and a third queue entry group QGC includes a plurality of third queue entries (c1 to cn). The number of queue entries belonging to each of the queue entry groups QGA, QGB and QGC is described as having n, but is not limited thereto.

The queue entries (a1 to an, b1 to bn and c1 to cn) belonging to different queue entry groups QGA, QGB and QGC have sizes different from each other. For example, as shown in FIG. 5, the sizes of the first queue entries (a1 to an) belonging to the first queue entry group QGA are smaller than the sizes of the second queue entries (b1 to bn) belonging to the second queue entry group QGB, and the sizes of the second queue entries (b1 to bn) belonging to the second queue entry group QGB may be smaller than the sizes of the third queue entries (c1 to cn) belonging to the third queue entry group QGC. In an example embodiment, queue entries in the same queue entry group may have the same size.

In this way, since the plurality of groups QGA, QGB and QGC are divided in accordance with the sizes of queue entries (a1 to an, b1 to bn, and c1 to cn), it is possible to efficiently use the memory. If the memory needs to include queue entries of only size, the memory may include only the queue entries of the largest size (e.g., queue entries belonging to the group QGC). In such a case, although a command having the command index of 1 needs a queue entry of a small size, there is a need to allocate a queue entry of a large size. On the other hand, in the first embodiment of the present invention, since the size of the necessary queue entry is differently allocated depending on the command, it is possible to efficiently use the memory.

Referring to FIG. 6, each of the queue entry group managers 133a, 133b and 133c possesses a list indicating whether the queue entry of the corresponding group QGB is in a free state (i.e., a usable state). Here, the list may be in a bitmap format, but is not limited thereto. Since the list is managed in a bitmap format, it may be managed easily and quickly.

The first queue entry group manager 133a possesses a list indicating whether each of the queue entries (a1 to an) belonging to the group QGA is in a free state. For example, the queue entry (a1) is in use (1), and the remaining queue entries (a2 to an) are in a free state (0).

The second queue entry group manager 133b possesses a list indicating whether each of the queue entries (b1 to bn) belonging to the group QGB is in the free state. For example, the queue entries (b1 and b2) are in use (1), and the remaining queue entries (b3 to an) are in the free state (0).

The third queue entry group manager 133c possesses a list indicating whether each of the queue entries (c1 to cn) belonging to the group QGC is in the free state. For example, all the queue entries (c1 to cn) are in the free state (0).

On the other hand, it is assumed that the queue entry requester 113 makes a queue entry request QEA for the first command CMD1, and the first command CMD1 requires, for example, the queue entries (a1 to an) corresponding to the first queue entry group QGA. In such a case, referring to FIG. 7, the first queue entry group manager 133a searches for the queue entry of the free state (e.g., a2) in the first group QGA, using the possessed list (bitmap). The first queue entry group manager 133a changes the state of the queue entry (e.g. a2) from 0 to 1 in the list. The first queue entry group manager 133a reports a free queue entry of an allocable free state (e.g., a2) to the queue entry return unit 135 (i.e., reports the index of the queue entry of the free state).

Referring to FIG. 3 again, the queue entry return unit 135 provides, in response to the queue entry request QEA, the queue entry (e.g., a2) of the free state to the queue entry requester 113 as the return signal QER. That is, the queue entry return unit 135 reports the index of the queue entry of the free state (e.g., a2) to the queue entry requester 113.

Referring to FIG. 2 again, the queue entry requester 113 receives provision of the return signal QER, and reports the allocated queue entry (e.g., a2) (i.e., the index of the allocated queue entry) to the data formatter 115 and the list manager 117. That is, the queue entry requester 113 generates a change instruction signal and an update instruction signal. The queue entry requester 113 provides the change instruction signal to the data formatter 115, and provides the update instruction signal to the list manager 117. The index of the allocated queue entry is included in the change instruction signal and the update instruction signal.

The data formatter 115 receives provision of the change instruction signal, changes the format of the first command CMD1 and stores the first command CMD1 with the changed format in the queue entry allocated from the queue manager 130 (i.e., the first queue entry). The data formatter 115 may store information (i.e., command variables) necessary when the core executes a command, for example, in the allocated first queue entry.

The queue entry requester 113 requests the list manager 117 to update the task list after the first queue entry is allocated from the queue manager 130. Here, referring to FIG. 8, the list manager 117 receives provision of the update instruction signal, and generates and updates task lists (HP, NP) to be executed by the core 200. As shown, there may be a plurality of task lists (HP, NP). For example, the task lists (HP, NP) may include a first task list NP of tasks that need to be processed rapidly, and a second task list HP of tasks that need to be processed at a normal speed. As shown, the second task list HP includes the tasks of W11 to W1n in an input order. Among the tasks, W11 is a head task stored earliest, and W1n is a tail task stored latest. The first task list NP includes tasks of W21 to W2n in the input order. Among the tasks, W21 is a head task stored earliest, and W2n is a tail task stored latest. Execution of the tasks of the task lists (HP, NP) means execution of commands corresponding to each task.

On the other hand, the list manager 117 determines the task list (HP or NP) to be updated among the plurality of task lists, depending on the groups QGA, QGB and QGC to which the allocated first queue entry belongs, and the list manager 117 may reflect the first command in the determined task list (e.g., HP). For example, if the group to which the allocated first queue entry belongs is QGA or QGB, the task list HP is updated so that the first command CMD1 is reflected. Or, if the group to which the first queue entry belongs is QGC, the task list NP is updated so that the first command CMD1 is reflected. In this way, it is possible to determine whether the first command CMD1 is a task that needs rapidly or a task that needs at a normal speed, depending on the groups QGA, QGB and QGC corresponding to the first command CMD1 determined by the queue entry checker 131 and the queue entry group managers 133a, 133b and 133c.

On the other hand, the data formatter 115 and the list manager 117 may operate in parallel. That is, while the data formatter 115 changes and stores the format of the first command CMD1, the list manager 117 may update the task lists (HP, NP). In this way, since the data formatter 115 and list manager 117 operate in parallel, the speed of the storage device may increase.

The data formatter 115 transmits the first signal to the handler 119 after completing the change and storage of the format of the first command CMD1. The list manager 117 provides the second signal to the handler 119 after completing the update of the task lists (HP, NP).

The handler 119 provides the completion signal ITC to the core 200 after being provided with the first signal and the second signal. That is, when the data formatter 115 completes the change and storage of the format of the first command CMD1, and the list manager 117 completes the update of the task lists (HP, NP), the handler 119 reports completion of operations to the core 200. As described above, since the data formatter 115 and the list manager 117 operate in parallel, the handler 119 needs to check the operations of the data formatter 115 and the list manager 117 and report the operations to the core 200.

Figure 9:
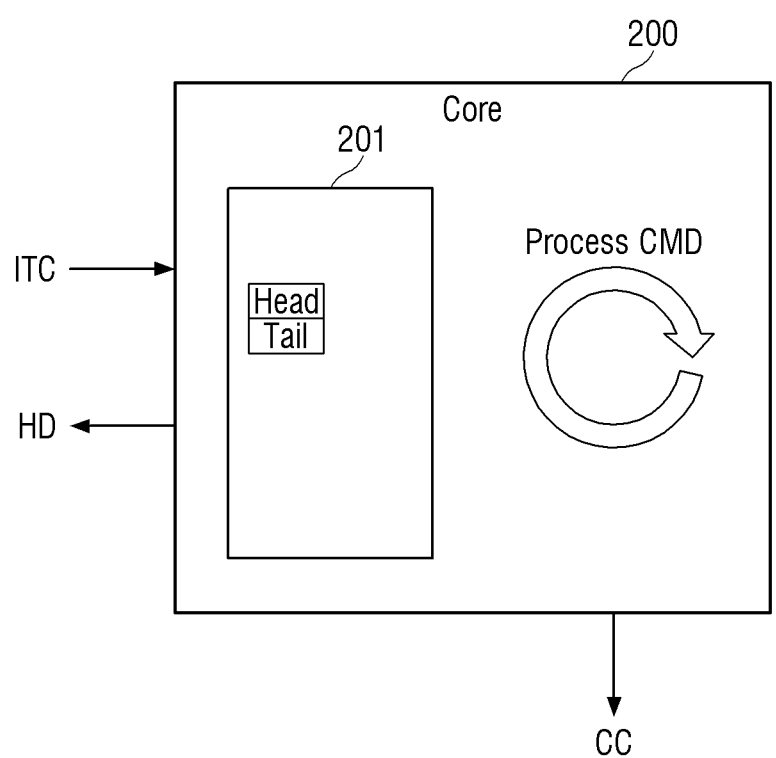
FIG. 9 is an exemplary block diagram for explaining a core of FIG. 1.

FIG. 9 is an exemplary block diagram for explaining the core of FIG. 1.

Referring to FIG. 9, the core 200 executes the first command CMD1 in accordance with the order of the updated task lists (HP, NP).

The core 200 may include a memory 201. Although the memory 201 is shown as being located inside the core 200, it may also be located outside the core 200. The memory 201 may be implemented by, for example, but is not limited to, a random access memory (RAM), a Dynamic RAM (DRAM), a Static RAM (SRAM), a buffer, a cache or a tightly coupled memory (TCM).

The head task and the tail task of the updated task list (e.g., HP) may be stored in the memory 201. That is, the tasks located between the head task and the tail task may not be stored in the memory 201. When executing the tasks in accordance with the task list HP, the core 200 executes a head task located at the top of the task list HP (that is, executes a command corresponding to the head task. Therefore, the head task is loaded in the memory 201 for a quick task execution of the core 200.

When the core 200 starts executing the head task, the core 200 transmits an instruction HD to the pre-processor 110 to delete the head task in the task lists (HP, NP). The pre-processor 110 receives the instruction HD and deletes the head task in the task lists (HP, NP). The core 200 also deletes the head task loaded in the memory 201.

Alternatively, after executing the head task, the core 200 may transmit the instruction HD or may delete the head task loaded in the memory 201.

Here, the reason for loading the tail task into the memory 201 is to check whether there is no longer any task to be executed. If the tail task is not loaded in the memory 201, the memory 201 becomes empty after the core 200 deletes the head task. In such a case, it is difficult for the core 200 to check whether there is no longer any task to be executed or although there is a task to be executed in the task list, the memory 201 is temporarily empty. However, if the tail task is loaded in the memory 201, since it means that there is more tasks to be executed, the core 200 requests the pre-processor 110 to perform the head task of the task lists (HP, NP).

After executing the first command CMD1 (that is, after executing the task corresponding to the first command CMD1), the core 200 outputs a result value CC according to the first command execution. The core 200 may use or change the contents of the first queue entry (e.g., a2 of FIG. 6) corresponding to the first command CMD1 to execute the first command CMD1.

Figure 10:
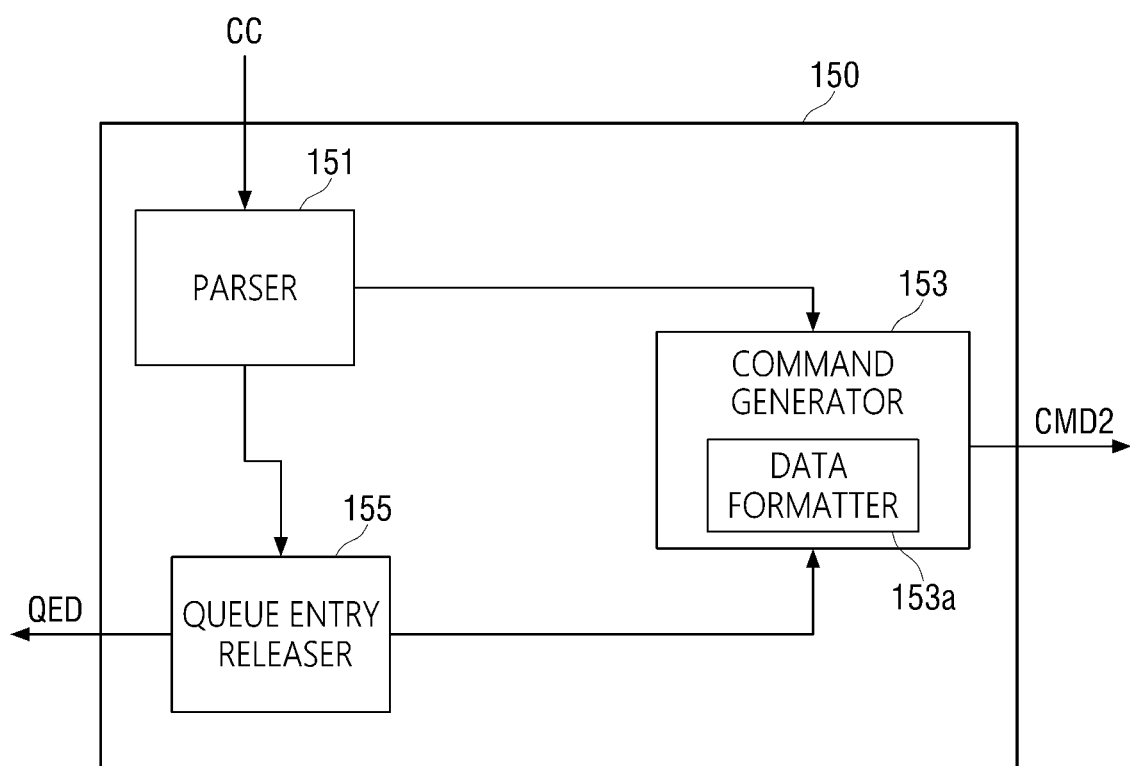
FIG. 10 is an exemplary block diagram for explaining a post-processor of FIG. 1.

FIG. 10 is an exemplary block diagram for explaining the post-processor of FIG. 1.

Referring to FIG. 10, the post-processor 150 generates and outputs a second command CMD2 in accordance with a preset format (i.e., a format for being transferred to other unit processors), on the basis of the result value CC provided from the core 200. In an example embodiment, the second command CMD2 may have a packet structure. The second command CMD2 may be an input to another unit processor and thus may have the same packet structure of the first command CMD1.

Here, the result value CC may include a first queue entry (e.g., a2 of FIG. 6) corresponding to the first command CMD1 (that is, an index indicating the queue entry). In such a case, the post-processor 150 converts the value stored in the first queue entry (e.g., a2) into the second command CMD2 in accordance with the preset format, and provides the second command CMD2 to the other unit processor. In an example embodiment, the preset format is different from a packet structure of the result value CC, and thus a packet structure of the result value CC provided by the core 200 is different from a packet structure of the second command CMD2 provided by the post-processor 150.

The post-processor 150 includes a parser 151, a command generator 153, a queue entry releaser 155, and the like.

The parser 151 fetches and interprets the result value CC provided from the core 200.

The command generator 153 includes a data formatter 153a inside, generates the second command CMD2 in accordance with the preset format of the result value, and outputs the second command CMD2 to other unit processors.

The queue entry releaser 155 receives the interpretation result from the parser 151, and may instruct the pre-processor 110 (that is, the list manager 117) to perform the allocated queue entry release QED.

Depending on the type of command, after execution of the command, the allocated queue entry may or may not be released. Unreleased queue entry may be released later (e.g., when a particular command is input from another unit processor).

Figure 11:
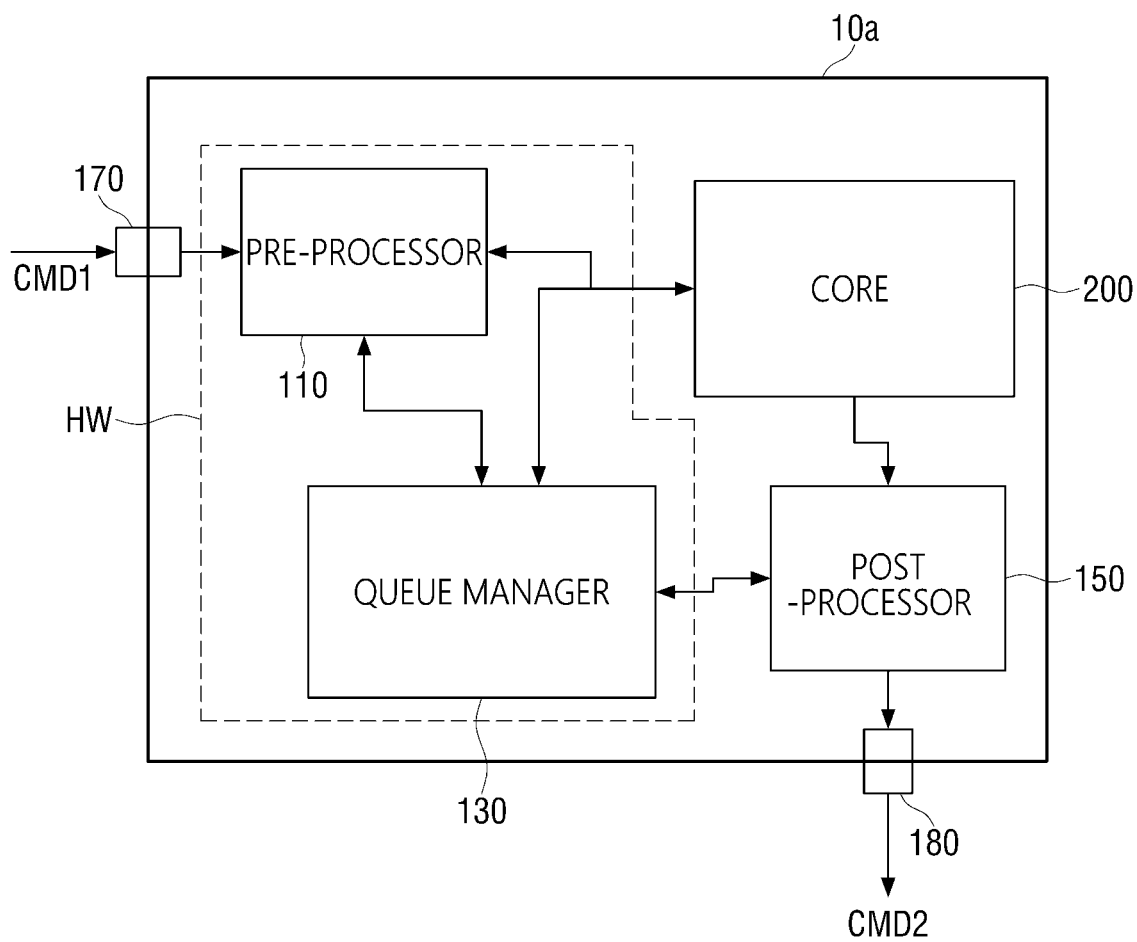
FIG. 11 is a block diagram for explaining a storage device according to a second embodiment of the present invention.
Figure 12:
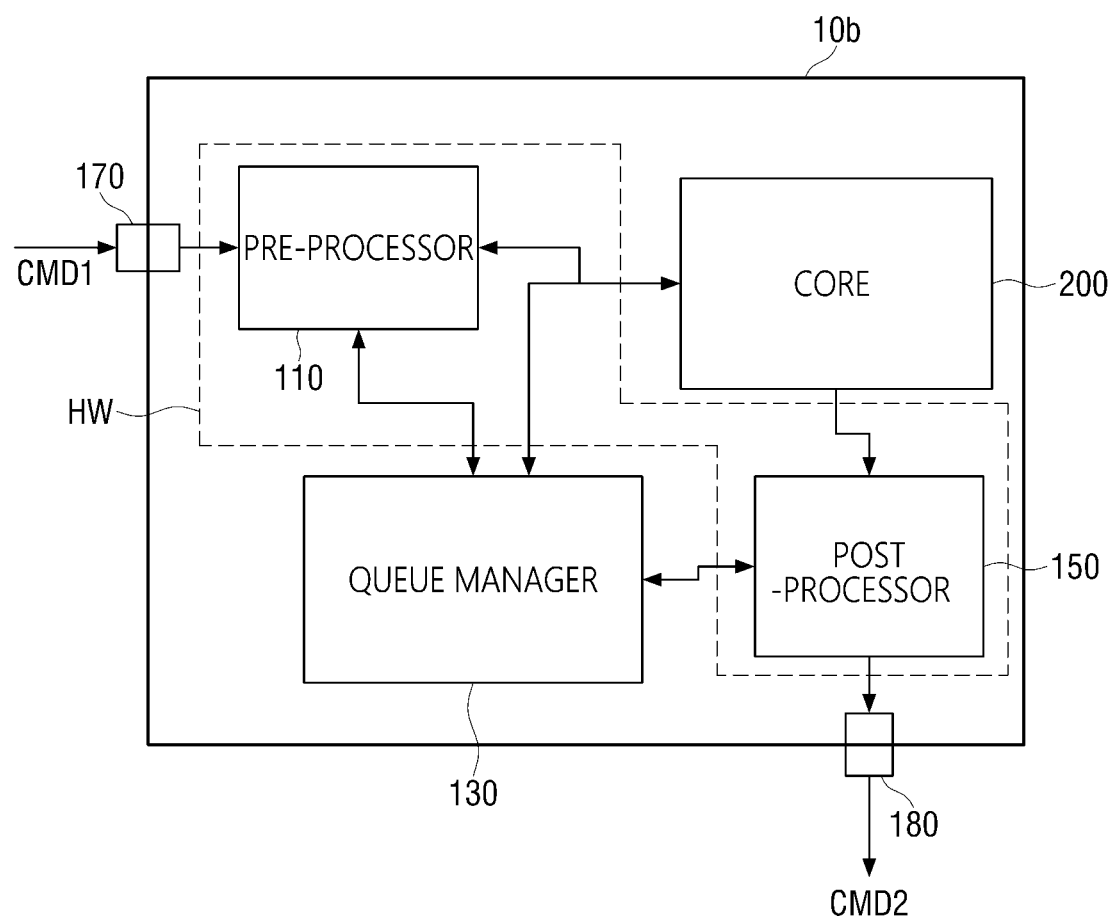
FIG. 12 is a block diagram for explaining a storage device according to a third embodiment of the present invention.

FIG. 11 is a block diagram for explaining a storage device according to a second embodiment of the present invention. FIG. 12 is a block diagram for explaining a storage device according to a third embodiment of the present invention. For convenience of explanation, the contents described above with reference to FIGS. 1 to 10 will be omitted.

In a unit processor 10a shown in FIG. 11, the pre-processor 110 and the queue manager 130 are implemented in hardware logic HW, and the post-processor 150 may not be implemented in hardware logic. Although the post-processor 150 and the core 200 are shown separately, the post-processor 150 and the core 200 may be in the form merged into one. In an example embodiment, logic elements of the core 200 and the post-processor 150 may be micro-programmed with a software.

In a unit processor 10b shown in FIG. 12, the pre-processor 110 and the post-processor 150 are implemented in hardware logic HW, and the queue manager 130 may not be implemented in hardware logic. Although the queue manager 130 and the core 200 are shown separately, the queue manager 130 and the core 200 may be in the form merged into one. In this case, the core 200 and the queue manager 130 may be implemented with a generic processor micro-programmed with software or firmware.

Although not shown separately, at least one of the pre-processor 110, the queue manager 130 and the post-processor 150 may be implemented in hardware logic. For example, only the pre-processor 110 may be implemented in hardware logic, only the post-processor 150 may be implemented in hardware logic, or only the queue manager 130 and the post-processor 150 may be implemented in hardware logic.

Figure 13:
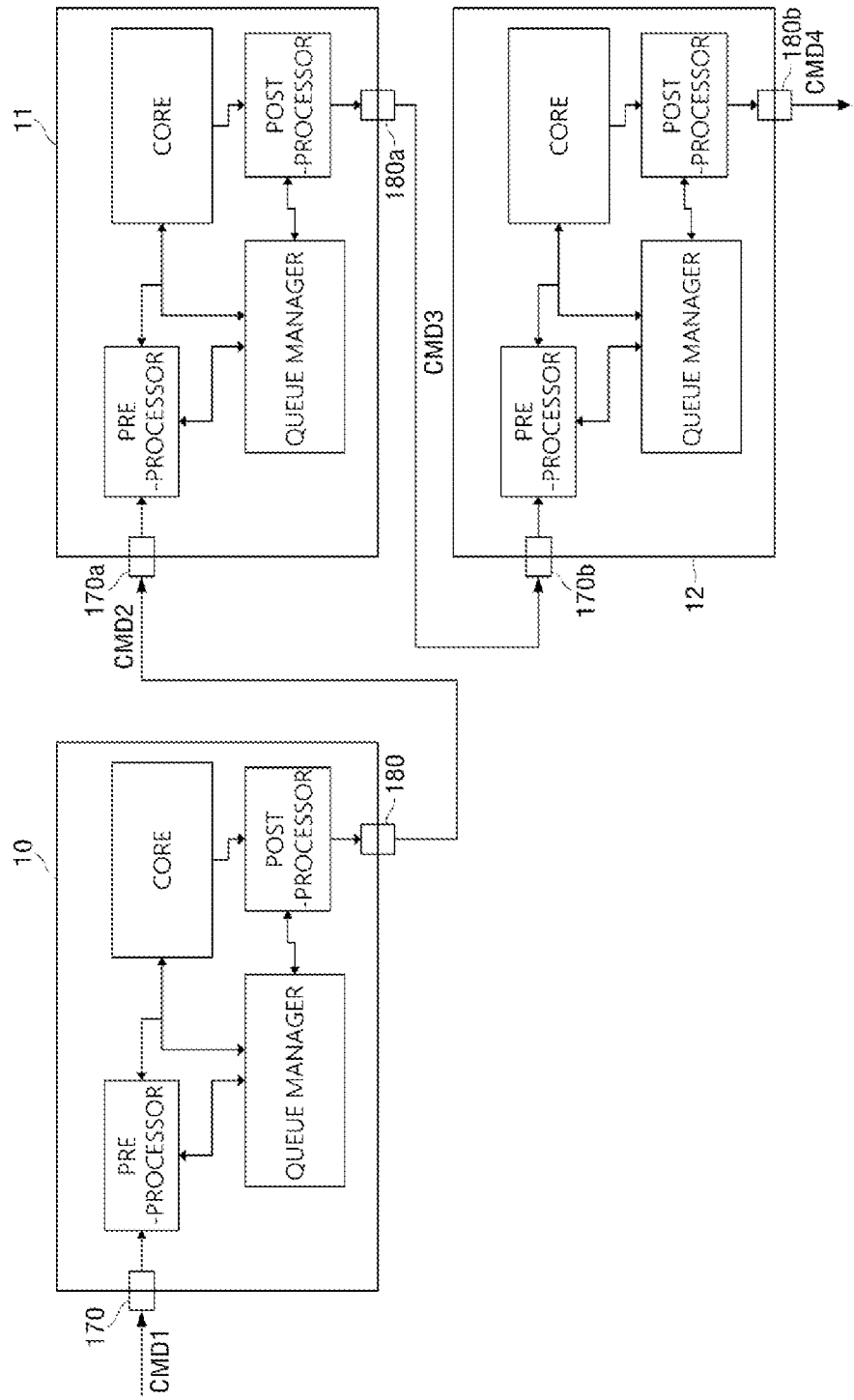
FIG. 13 is a block diagram for explaining a storage device according to a fourth embodiment of the present invention.

FIG. 13 is a block diagram for explaining a storage device according to a fourth embodiment of the present invention.

Referring to FIG. 13, the storage device according to the fourth embodiment of the present invention includes a plurality of unit processors 10, 11 and 12 connected in series.

The unit processors 10, 11 and 12 execute tasks sequentially.

Specifically, the first unit processor 10 receives provision of the first command CMD1 through the first input stage 170, executes a task corresponding to the first command CMD1, and then outputs a second command CMD2 through the first output stage 180.

The second unit processor 11 receives the provision of the second command CMD2 through the second input stage 170a, executes a task corresponding to the second command CMD2, and then outputs a third command CMD3 through the third output stage 180a.

The third unit processor 12 receives the provision of the third command CMD3 through the third input stage 170b, executes a task corresponding to the third command CMD3, and then outputs a fourth command CMD4 through the third output stage 180b.

Each of the unit processors 10, 11 and 12 has substantially the same configuration.

For example, the first unit processor 10 includes a first queue manager, a first pre-processor, a first core, a second post-processor, and the like.

The first queue manager allocates a first queue entry for the provided first command. The first pre-processor stores the first command in the first queue entry and updates the first task list so that the first command is reflected. The first core executes the first command in accordance with an order specified in the updated first task list to output a result value according to the execution of the first command. The first post-processor generates and outputs a second command in accordance with a preset format on the basis of the result value. Here, at least one of the first queue manager, the first pre-processor, and the first post-processor may be implemented in hardware logic.

In particular, while the first core executes the first command, the first queue manager allocates the queue entries for other commands other than the first command, or the first pre-processor may store the other commands in the allocated queue entry or may update the first task list so that the stored other commands are reflected.

Similarly, the second unit processor 11 includes a second queue manager, a second pre-processor, a second core, a second post-processor, and the like.

The second queue manager allocates a second queue entry for the second command. The second pre-processor stores the second command in the second queue entry and updates a second task list with the second command. The second core executes the second command in accordance with an order specified in the updated second task list to output a result value according to execution of the second command. The second post-processor generates and outputs a third command in accordance with a preset format on the basis of the result value. Here, at least one of the second queue manager, the second pre-processor, and the second post-processor may be implemented in hardware logic.

Similarly, the third unit processor 12 includes a third queue manager, a third pre-processor, a third core, a third post-processor, and the like.

The third queue manager allocates a third queue entry for the third command. The third pre-processor stores the third command in the third queue entry, and updates a third task list with the third command. The third core executes the third command in accordance with an order specified in the updated third task list to output a result value according to execution of the third command. The third post-processor generates and outputs a fourth command in accordance with a preset format on the basis of the result value. Here, at least one of the third queue manager, the third pre-processor, and the third post-processor may be implemented in hardware logic.

On the other hand, as described above, the plurality of unit processors 10, 11 and 12 require a preset memory 190 of FIG. 5, for example, for storing the commands. The memory includes a first memory region used by the first unit processor 10, a second memory region used by the second unit processor 11, and a third memory region used by the third unit processor 12. Here, the first memory region, the second memory region, and the third memory region are separated from each other. For example, the first unit processor 10 exclusively uses the first memory region without using the second memory region and the third memory region. A plurality of queue entry regions is set in each memory region.

Figure 14:
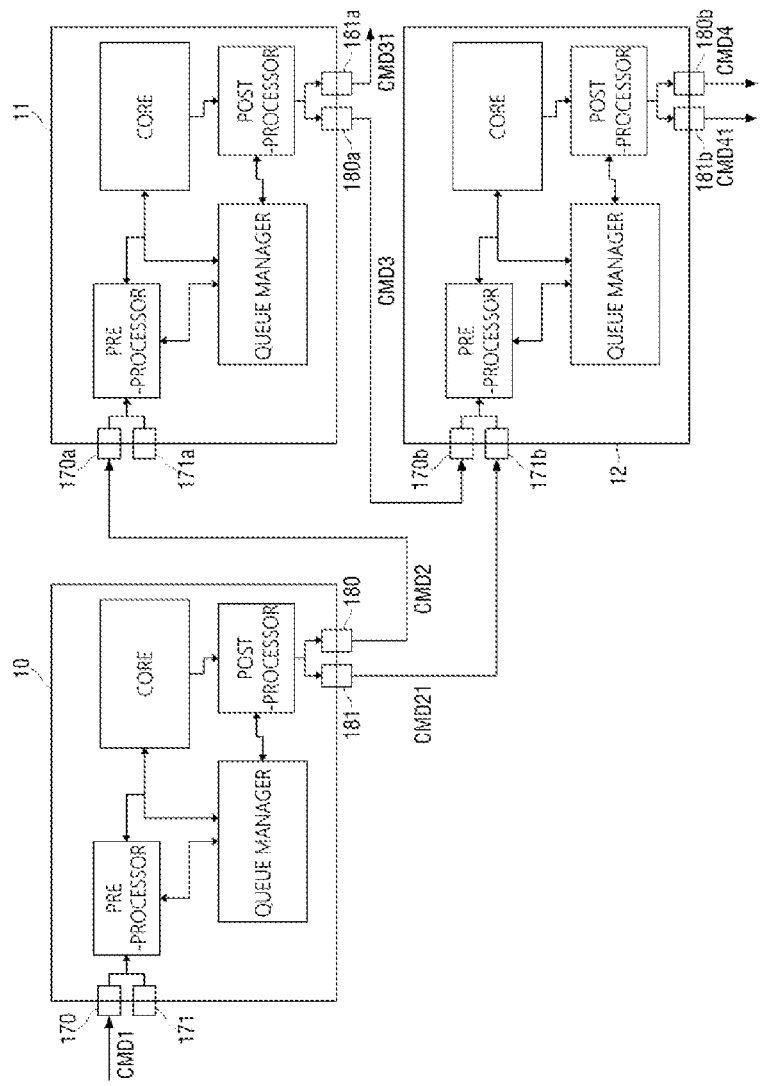
FIG. 14 is a block diagram for explaining a storage device according to a fifth embodiment of the present invention.

FIG. 14 is a block diagram for explaining a storage device according to a fifth embodiment of the present invention. For convenience of explanation, the substantially same contents as those described using FIG. 13 will be omitted.

Referring to FIG. 14, the storage device according to the fifth embodiment of the present invention includes a plurality of unit processors 10, 11 and 12 connected series and/or in parallel. Each of the unit processors 10, 11 and 12 may include two or more input stages or two or more output stages.

Specifically, the first unit processor 10 receives provision of a first command CMD1 through a first input stage 170, executes a task corresponding to the first command CMD1, and then outputs a second command CMD2 to the second unit processor 11 through a first output stage 180. Also, the first unit processor 10 outputs a command CMD21 to the third unit processor 12 through an output stage 181 different from the first output stage 180.

The second unit processor 11 receives the provision of the second command CMD2 through a second input stage 170a, executes a task corresponding to the second command CMD2, and then outputs a third command CMD3 to the third unit processor 12 through a second output stage 180a. Also, the second unit processor 11 outputs a command CMD31 through an output stage 181a different from the second output stage 180a.

The third unit processor 12 receives the provision of the third command CMD3 through a third input stage 170b, executes a task corresponding to the third command CMD3, and then outputs a fourth command CMD4 through a third output stage 180b. Also, the third unit processor 12 outputs a command CMD41 through an output stage 181b different from the third output stage 180b.

Each of the unit processors 10, 11, 12 has substantially the same configuration.

Figure 15:
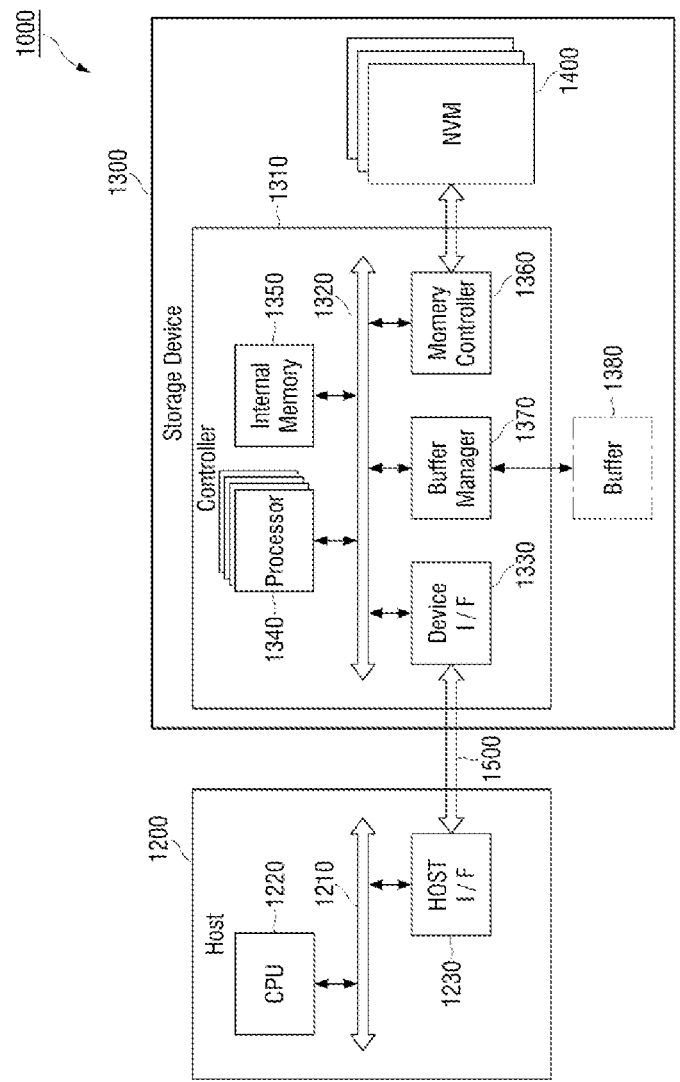
FIG. 15 is a block diagram for explaining a storage device according to a sixth embodiment of the present invention.

FIG. 15 is a block diagram for explaining a storage device according to a sixth embodiment of the present invention.

Referring to FIG. 15, a storage device 1300 according to the sixth embodiment of the present invention is applied to a data processing system 1000, and the storage device 1300 and a host 1200 are connected/communicate with each other through an interface 1500.

According to the embodiments, the data processing system 1000 may be implemented by, but is not limited to, a personal computer (PC), a desktop computer, a laptop computer, a workstation computer or a mobile computing device.

The aforementioned mobile computing device may be implemented by a mobile phone, a smart phone, a tablet PC, a personal digital assistant (PDA), an enterprise digital assistant (EDA), a digital still camera, a digital video camera, a portable multimedia player (PMP), a multimedia device, a personal navigation device or a portable navigation device (PND), a handheld game console, a mobile internet device (MID), a wearable device (or wearable computer), an internet of things (IoT) device, an internet of everything (IoE) device or an e-book.

The interface 1500 may be implemented by a SATA (serial advanced technology attachment) interface, a SATAe (SATA express) interface, a SAS (serial attached small computer system interface (SCSI)), a PCIe (peripheral component interconnect express) interface, a NVMe (nonvolatile memory Express) interface, an AHCI (advanced host controller interface), a NAND-type flash memory interface or a multimedia card (MMC) interface. However, the interface 1500 is not limited thereto. According to the embodiments, the interface 1500 may transmit electrical signals or optical signals.

The host 1200 may control a data processing operation (e.g., a write operation (or a program operation) or a read operation) of the storage device 1300 through the interface 1500. For example, the host 1200 may mean a host controller.

According to the embodiment, although the host 1200 may be implemented by an integrated circuit (IC), a mother board, an application processor (AP), a mobile AP or a system on chip (SoC), the host 1200 is not limited thereto The CPU 1220 and the host interface 1230 may exchange commands and/or data to each other through a bus 1210.

Although the bus 1210 may be implemented by an advanced microcontroller bus architecture (AMBA), an advanced high-performance bus (AHB), an advanced peripheral bus (APB), an advanced eXtensible interface (AXI), an advanced system bus (ASB) or a combination thereof, the bus 1210 is not limited thereto.

The CPU 1220 may generate a write request that may control a write operation of the storage device 1300 or a read request that may control a read operation of the storage device 1300. The write request may include a write address, and the read request may include a read address. For example, the CPU 1220 may include one or more cores. A request may mean a command.

The host interface 1230 may change the format of commands and/or data to be transmitted to the storage device 1300, and may transmit the changed commands and/or changed data to the storage device 1300 through the interface 1500. Also, the host interface 1230 may change the format of the response and/or data transmitted from the storage device 1300, and may transmit the changed response and/or changed data to the CPU 1220 through the bus 1210. According to the embodiment, the host interface 1230 may include a transceiver capable of transmitting and receiving commands and/or data. The structure and operation of the host interface 1230 may be implemented to be suitable for the structure and operation of the interface 1500.

The storage device 1300 may include a controller 1310 and a nonvolatile memory 1400. According to the embodiments, the storage device 1300 may further include a buffer 1380.

The storage device 1300 may store data that is output from the host 1200 in the nonvolatile memory 1400 in accordance with the control of the controller 1310.

Although the storage device 1300 may be implemented by a flash memory-based memory device, the storage device 1300 is not limited thereto. For example, although the storage device 1300 may be implemented by a smart card, a secure digital (SD) card, a multimedia card (MMC), an embedded MMC (eMMC), an embedded multi-chip package (eMCP), a perfect page NAND (PPN), a universal flash storage (UFS), a USB flash drive, a solid state drive (SSD) or an embedded SSD (eSSD), the storage device 1300 is not limited thereto.

The controller 1310 may control commands and/or data exchanged between the host 1200 and the nonvolatile memory 1400. According to the embodiments, the controller 1310 may be implemented by an IC or SoC. The controller 1310 may include a bus 1320, a device interface 1330, processors 1340, an internal memory 1350, a memory controller 1360, and a buffer manager 1370.

Although the bus 1320 may be implemented by an AMBA, an AHB, an APB, an AXI, an ASB or a combination thereof, the bus 1320 is not limited thereto.

The device interface 1330 may change the format of responses and/or data to be transmitted to the host 1200, and may transmit the changed responses and/or changed data to the host 1200 through the interface 1500. Also, the device interface 1330 may receive commands and/or data transmitted from the host 1200, may change the format of the received commands and/or data, and may transmit the changed commands and/or changed data to the processors 1340 and/or the buffer manager 1370. According to the embodiment, the device interface 1330 may include a transceiver that may transmit and receive signals and/or data. The structure and operation of the device interface 1330 may be implemented to be suitable for the structure and operation of the interface 1500.

The processors 1340 may control the device interface 1330, the internal memory 1350, the memory controller 1360, and the buffer manager 1370 through the bus 1320. The processors 1340 may execute firmware (or a computer program) that may control the operation of the storage device 1300. According to the embodiments, the controller 1310 may include some processors that process commands and/or data output from the host 1200, and some processors that control an access operation on the nonvolatile memories 1400, for example, a write operation, a read operation and/or an erase operation.

Each processor 1340 corresponds to the unit processors 10, 10a and 10b described using FIGS. 1 through 12. For example, the processors 1340 may include hardware logic that receives provision of the command, updates the task list so that the command is reflected, changes the command to a preset format and stores the command with the preset format, and a core that executes a command in accordance with the order of the updated task list. Also, the hardware logic may receive provision of the execution result value of the command from the core, and may generate and output an additional command to be suitable for a preset format.

In addition, a connection relationship between the plurality of processors 1340 is the same as, for example, that described in FIGS. 13 and 14.

The internal memory 1350 may store data necessary for the operation of the controller 1310 or data generated by a data processing operation (e.g., a write operation or a read operation) executed by the controller 1310. According to the embodiments, although the internal memory 1350 may be implemented by a RAM, a DRAM, a SRAM, a buffer, a buffer memory, a cache or a tightly coupled memory (TCM), the internal memory 1350 is not limited thereto.

The internal memory 1350 may store a flash translation layer (FTL) loaded from at least one of the nonvolatile memories 1400. The FTL may mean firmware for performing an address mapping for mapping a logical address, which is output from the host 1200, to a physical address of the nonvolatile memories 1400, a wear-leveling and/or a garbage collection.

The memory controller 1360 may control data processing operations (e.g., a write operation, a read operation and/or an erase operation) of the nonvolatile memories 1400 in accordance with the control of the processors 1340. For example, when the nonvolatile memories 1400 are implemented by a flash memory, the memory controller 1360 may perform the functions of the flash memory controller. The memory controller 1360 and the nonvolatile memories 1400 may exchange control signals and/or data through the channels.

The memory controller 1360 may control the execution of garbage collection on the data blocks included in the nonvolatile memories 1400. According to the embodiments, the memory controller 1360 may manage the mapping table information of data blocks related to execution of the garbage collection.

According to the embodiments, the memory controller 1360 may support, but is not limited to, a SATA interface, a SATAe interface, a SAS, a PCIe interface, an NVMe interface, an AHCI, an MMC interface, a NAND-type flash memory interface or a NOR-type flash memory interface.

The buffer manager 1370 may write data on the buffer 1380 or read data from the buffer 1380. According to the embodiments, the buffer 1380 may be implemented by, but is not limited to, a RAM, a SRAM or a DRAM.

The buffer 1380 may store a mapping table for logical address-physical address conversion on the nonvolatile memories 1400, and a bitmap associated with mapping table information on each of the data blocks included in the nonvolatile memories 1400. The bitmap may include the number of mapping tables and index information on the data block. The mapping table and the bitmap may be updated by FTL.

The buffer 1380 may also perform a function of a cache for temporarily storing the write data to be transmitted to the nonvolatile memory 1400.

According to the embodiments, when each of the controller 1310 and the buffer 1380 is implemented by semiconductor chips different from each other, the controller 1310 and the buffer 1380 may be implemented by, but is not limited to, one package, for example, a package-on-package (PoP), a multi-chip package (MCP) or a system-in package (SiP).

The nonvolatile memories 1400 may store an operation system (OS), various programs, and various data. Each of the nonvolatile memories 1400 may include at least one memory cell array. Each of the nonvolatile memories 1400 may be implemented by a semiconductor chip or a semiconductor package. At least one panel may be disposed (or formed) between the memory controller 1360 and the nonvolatile memory 1400. The channel may include transmission lines which transmit commands and/or data. According to the embodiments, the nonvolatile memories 1400 may be implemented by an A channel*B way. Here, each of A and B may be a natural number of 1 or more.

The memory cell array may include a two-dimensional memory cell array or a three-dimensional memory cell array. The three-dimensional memory cell array is formed monolithically within one or more physical levels of an array of memory cells having an active region disposed on or above a silicon substrate, and may include a circuit related to the operation of the memory cells. The circuit may be formed inside or on or above the substrate.

The term "monolithic" means that the layers of each level of the array are directly deposited on layers of each underlying level of the array.

The three-dimensional memory cell array may include a vertical NAND string that is vertically oriented such that at least one memory cell is located over the other memory cell. The at least one memory cell may include a charge trap layer.

In concluding the detailed description, those skilled in the art will appreciate that many variations and modifications may be made to the embodiments without substantially departing from the principles of the present invention. Therefore, the disclosed preferred embodiments of the invention are used in a generic and descriptive sense only and not for purposes of limitation.

What is claimed is:

1. A semiconductor storage device comprising:
   a first processor including a first pre-processor, a first queue manager, a first post-processor and a first core;
   a second processor including a second pre-processor, a second queue manager, a second post-processor and a second core; and
   a third processor including a third pre-processor, a third queue manager, a third post-processor and a third core,
   wherein the first pre-processor is configured to interpret a first command, change a format of the first command, and store the first command with the changed format in a first queue entry, the first queue manager is configured to allocate, in response to the interpretation result of the first pre-processor, the first queue entry for the first command with the changed format, the first core is configured to execute the first command with the changed format and to generate a first value according to execution of the first command with the changed format, the first post-processor is configured to generate a second command based on the first value,
   the second pre-processor is configured to interpret the second command and store the second command in a second queue entry, the second queue manager is configured to allocate, in response to the interpretation result of the second pre-processor, the second queue entry for the second command, the second core is configured to execute the second command and to generate a second value according to execution of the second command, the second post-processor is configured to generate a third command based on the second value,
   the third pre-processor is configured to interpret the third command and store the third command in a third queue entry, the third queue manager is configured to allocate, in response to the interpretation result of the third pre-processor, the third queue entry for the third command, the third core is configured to execute the third command and to generate a third value according to execution of the third command, and the third post-processor is configured to generate a fourth command based on the third value.

2. The storage device of claim 1,
   wherein at least one of the first pre-processor, the first queue manager and the first post-processor is implemented by a customized logic circuit.

3. The storage device of claim 1,
   wherein the first core executes a first operation based on the first command with the changed format.

4. The storage device of claim 1,
   wherein the first core is driven by software or firmware.

5. The storage device of claim 1,
   wherein the first pre-processor and the first queue manager are implemented by a customized logic circuit, and
   the first post-processor is driven by software or firmware.

6. The storage device of claim 1,
   wherein the first pre-processor and the first post-processor are implemented by a customized logic circuit, and
   the first queue manager is driven by software or firmware.

7. The storage device of claim 1,
   wherein the first pre-processor updates a task list with the first command, and the first core executes the first command in accordance with an order specified in the updated task list.

8. A semiconductor storage device comprising:
   a first processor including a first pre-processor, a first queue manager, a first post-processor and a first core;
   a second processor including a second pre-processor, a second queue manager, a second post-processor and a second core; and
   a third processor including a third pre-processor, a third queue manager, a third post-processor and a third core,
   wherein the first pre-processor is configured to interpret a first command, change a format of the first command, and store the first command with the changed format in a first queue entry, the first queue manager is configured to allocate, in response to the interpretation result of the first pre-processor, the first queue entry for the first command with the changed format, the first core is configured to execute the first command with the changed format and to generate a first value according to execution of the first command with the changed format, the first post-processor is configured to generate a second command and a third command based on the first value, the second pre-processor is configured to interpret the second command and store the second command in a second queue entry, the second queue manager is configured to allocate, in response to the interpretation result of the second pre-processor, the second queue entry for the second command, the second core is configured to execute the second command and to generate a second value according to execution of the second command, the second post-processor is configured to generate a fourth command based on the second value, the third pre-processor is configured to interpret the third command and the fourth command, and store the third command in a third queue entry and/or the fourth command in a fourth queue entry, the third queue manager is configured to allocate, in response to the interpretation result of the third pre-processor, the third queue entry and/or the fourth queue entry, the third core is configured to execute the third command and/or the fourth command, and to generate a third value according to execution of the third command and/or a fourth value according to execution of the fourth command, and the third post-processor is configured to generate a fifth command based on the third value and/or the fourth value.

9. The storage device of claim 8,
wherein at least one of the first pre-processor, the first queue manager and the first post-processor is implemented by a customized logic circuit.

10. The storage device of claim 8, wherein the first core executes a first operation based on the first command with the changed format.

11. The storage device of claim 8,
wherein the first core is driven by software or firmware.

12. The storage device of claim 8,
wherein the first pre-processor and the first queue manager are implemented by a customized logic circuit, and
the first post-processor is driven by software or firmware.

13. The storage device of claim 8,
wherein the first pre-processor and the first post-processor are implemented by a customized logic circuit, and
the first queue manager is driven by software or firmware.

14. The storage device of claim 8,
wherein the first pre-processor updates a task list with the first command, and the first core executes the first command in accordance with an order specified in the updated task list.

15. A semiconductor storage device comprising:
a first processor including a first pre-processor, a first queue manager, a first post-processor and a first core; and
a second processor including a second pre-processor, a second queue manager, a second post-processor and a second core,
wherein the first pre-processor is configured to interpret a first command, change a format of the first command, and store the first command with the changed format in a first queue entry, the first queue manager is configured to allocate, in response to the interpretation result of the first pre-processor, the first queue entry for the first command with the changed format, the first core is configured to execute the first command with the changed format and to generate a first value according to execution of the first command with the changed format, the first post-processor is configured to generate a second command based on the first value, the second pre-processor is configured to interpret the second command and store the second command in the second queue entry, the second queue manager is configured to allocate, in response to the interpretation result of the second pre-processor, a second queue entry for the second command, the second core is configured to execute the second command and to generate a second value according to execution of the second command, the second post-processor is configured to generate a third command based on the second value, and at least one of the first pre-processor, the first queue manager and the first post-processor is implemented by a customized logic circuit.

16. The storage device of claim 15,
wherein the first core executes a first operation based on the first command with the changed format.

17. The storage device of claim 15,
wherein the first core is driven by software or firmware.

18. The storage device of claim 15,
wherein the first pre-processor updates a task list with the first command, and the first core executes the first command with the changed format in accordance with an order specified in the updated task list.

19. The storage device of claim 15, further comprising
a memory configured to store the first command, the second command and the third command, and including a first memory region used by the first processor and a second memory region used by the second processor.

20. The storage device of claim 15,
wherein while the first core executes the first command with the changed format, the first queue manager allocates a third queue entry for a fourth command.

* * * * *